March 29, 1927.  H. S. LEE  1,622,875

MOLDING MACHINE

Filed Jan. 31, 1925  3 Sheets-Sheet 1

INVENTOR.
Harry S. Lee.
BY Stuart C Barnes
ATTORNEY.

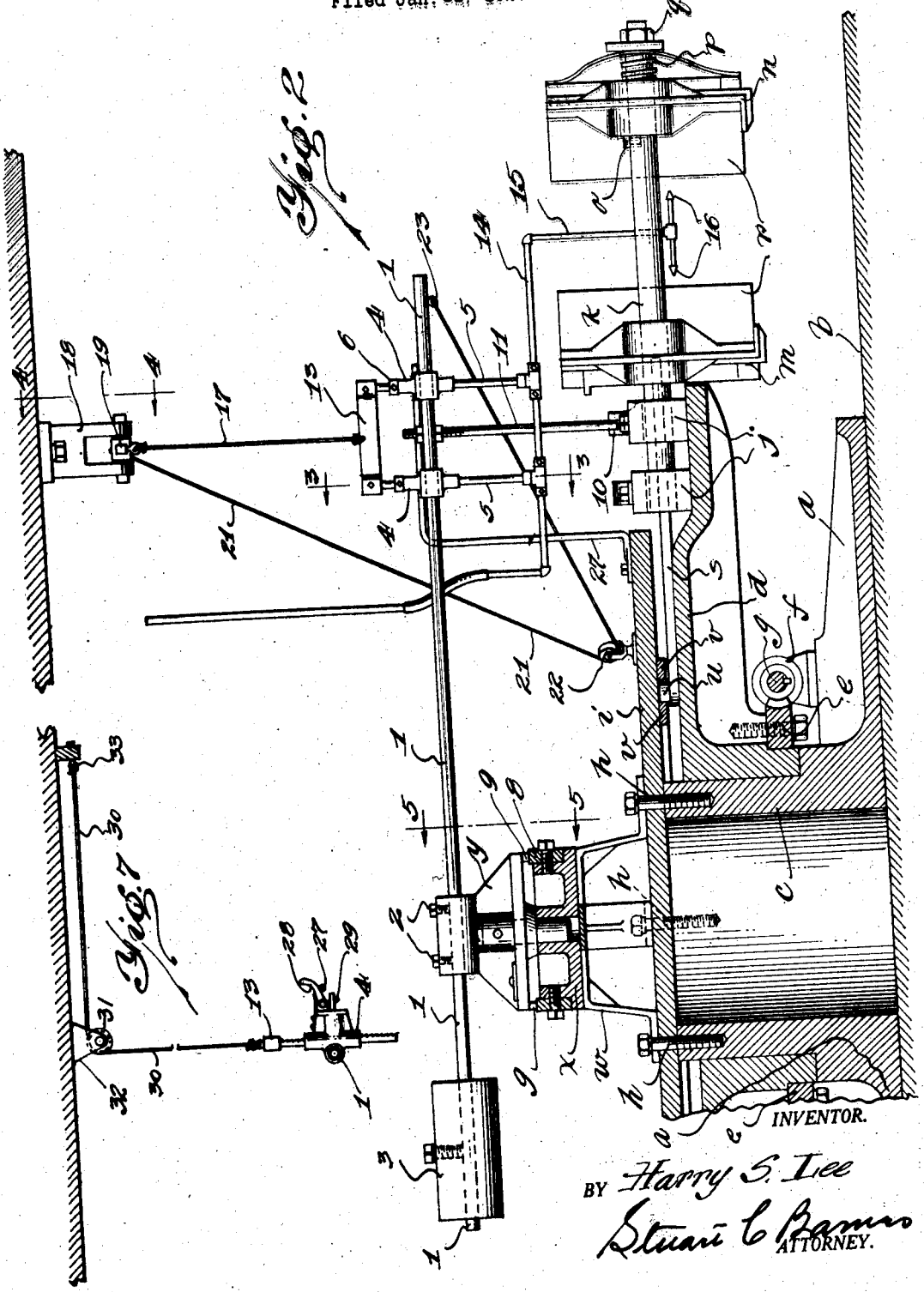

March 29, 1927.
H. S. LEE
MOLDING MACHINE
Filed Jan. 31, 1925   3 Sheets-Sheet 3
1,622,875
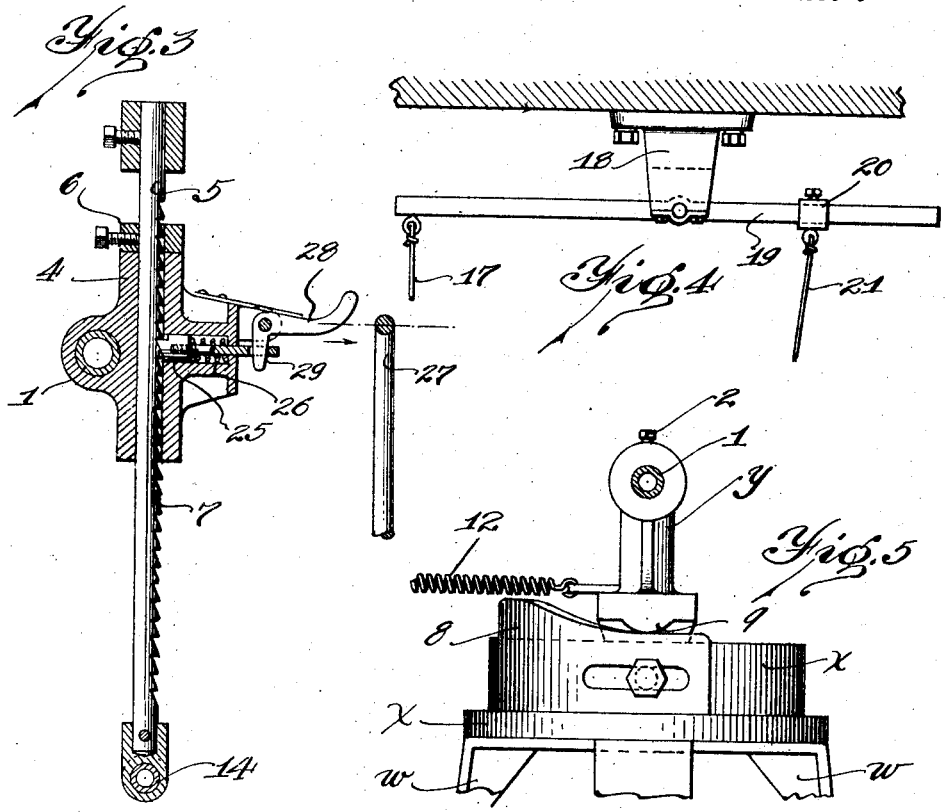
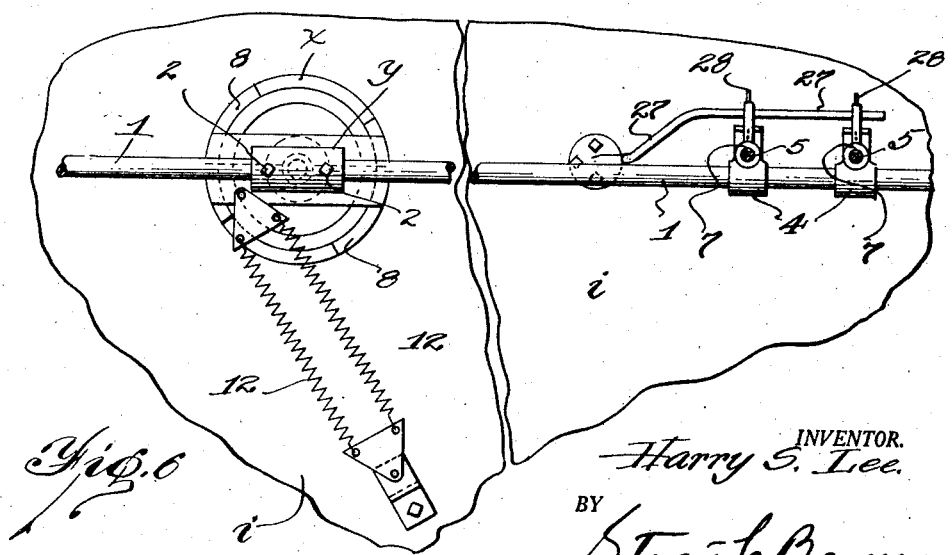
INVENTOR.
Harry S. Lee.
BY
ATTORNEY.

Patented Mar. 29, 1927.

1,622,875

UNITED STATES PATENT OFFICE.

HARRY S. LEE, OF PLYMOUTH, MICHIGAN.

MOLDING MACHINE.

Application filed January 31, 1925. Serial No. 5,988.

This invention relates to an apparatus for automatically applying an even film of carbon to molds. It is desirable to coat a so-called permanent mold with a coating of carbon, both as a protection for the material of the mold and as a parting material. It has already been proposed to do this by using an acetylene flame, but so far as I am aware, no method has been devised nor any apparatus designed for insuring an even distribution of the carbon on the interior of the mold. This is especially desirable as it results in a much more accurate casting than is the case where the application of the carbon to the mold is made by a small flame and distribution of the carbon is entirely governed by the eye and the hand of the operator.

This application is directed to an apparatus which is calculated to automatically open and close the mold sections and to drop the flame between the mold sections and raise the same therealong by a gradual movement. One of the main features of this apparatus is the arrangement for opening and closing the mold sections. This operates to place the thrust and the draft of the closing and opening operation directly on the center line of the mold sections, so there will be no sticking or cramping in the operation. This will be more fully explained hereinafter.

Referring to the drawings:

Fig. 2 is a vertical section taken on the line 2—2 of Fig. 1.

Fig. 3 is a detailed section taken on the line 3—3 of Fig. 2.

Fig. 4 is a detailed section taken on the line 4—4 of Fig. 2.

Fig. 5 is a detailed section taken on the line 5—5 of Fig. 2.

Fig. 6 is a fragmentary plan view of the flame-lifting mechanism.

Fig. 7 is a detail of a modified hook-up.

Figure 1:
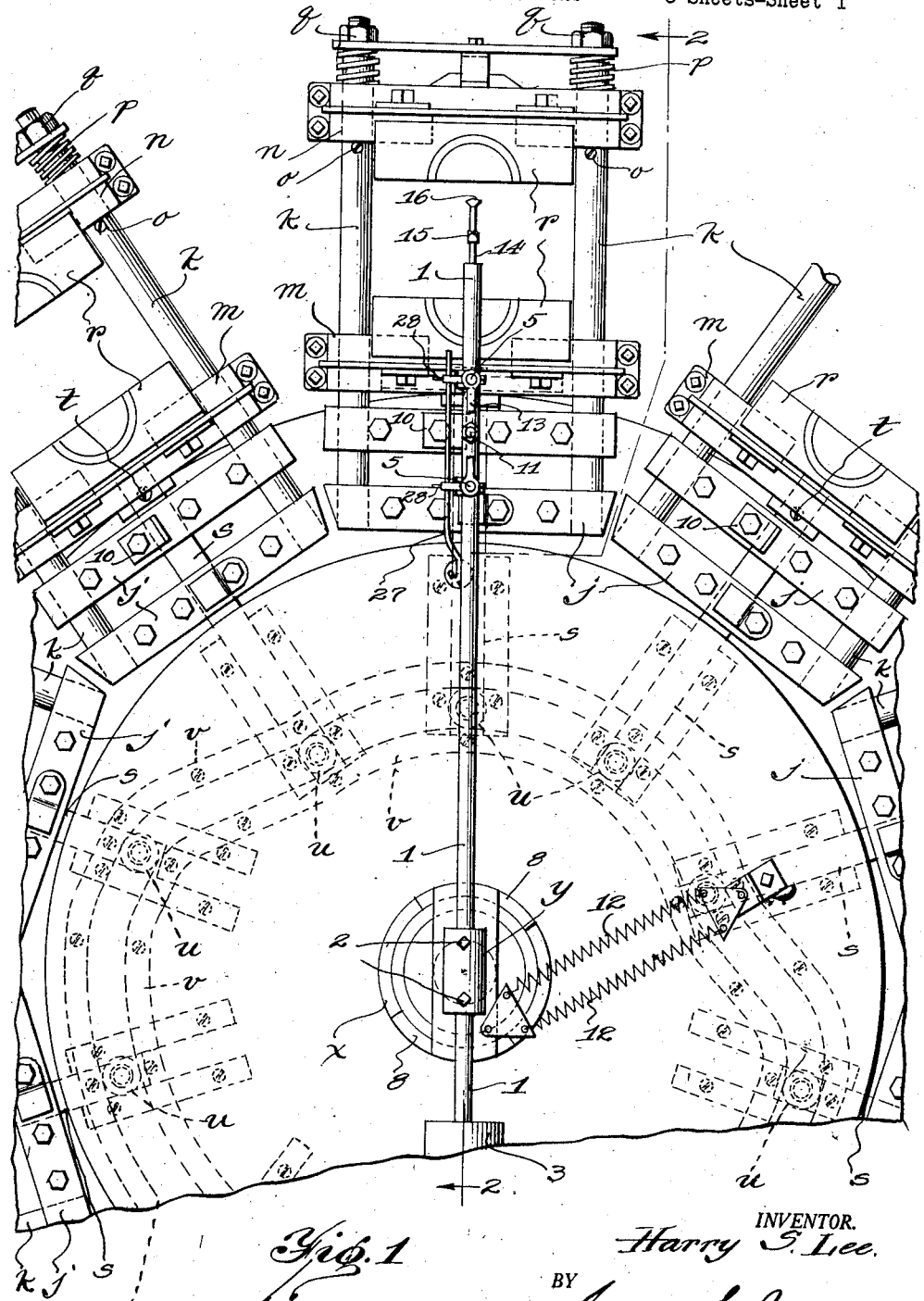
Fig. 1 is a fragmentary plan view of the permanent mold machine, showing a revolving table provided with mold carriers which open and close.

$a$ designates a support which may be rigidly secured to the floor $b$, and is provided with the hub $c$, which in turn rotatably supports the revolving table $d$. Secured to this revolving table is a large ring gear $e$, which is arranged to mesh with the worm $f$ connected in driving relation with the shaft $g$, which is in turn connected to any suitable source of power. Bolted, or otherwise secured, as at $h$ to the support $a$ is a stationary table $i$.

The blocks $j$ are bolted to the revolving table near the periphery thereof and support the guide bars $k$. Slidably supported on these guide bars are the mold carriers $m$ and $n$ respectively, the latter carrier positioned near the extremity of the guide bars and limited in its inward movement by the stop pins $o$. Bearing against the opposite side of the mold carrier $n$ is a coil spring $p$ and the nuts $q$ secured on the end of the guide bars $k$ may be turned to adjust the compression of the springs $p$. The mold carrier $n$ slidably supported on the guide bars is provided with sufficient clearance therewith so that the mold carrier may rock slightly.

The molds are secured to said mold carriers and when the mechanism, later to be described, moves the inner mold section up against the outer mold section the springs $p$ are compressed slightly and exert a pressure inwardly on the outer mold section so that the two mold sections will make a tight contact. The limited rocking movement of the outer mold carrier and mold section carried thereby permits the self-alignment of the mold sections, so that the same will exactly meet even if one of the mold sections becomes worn.

The slide bar $s$ is secured as at $t$ to the inner mold carrier, and is provided on its inner end with a roller $u$ which is engaged in the continuous cam groove $v$, secured to the underside of the stationary table $i$. In Fig. 1 the shape of this cam is shown and obviously as the revolving table is revolved it causes the rollers to ride in the cam groove and follow the cam for the purpose of reciprocating the slide bar $s$ to open or close the mold sections.

At one point in the period of revolution of the revolving table it is desired to coat the molds with a film of carbon. This may be obtained by passing a yellow flame by the mold, and as a result of the incomplete combustion of the flame, carbon is deposited on the mold. It is desirable to coat this mold with an even film of carbon, because when the coating of carbon is uneven it results in an uneven casting.

This invention pertains to a novel means whereby an even deposit of carbon on the molds is obtained. The bracket $w$ is secured to the stationary table $i$ at the center, and supports the base $x$, which in turn rotatably and slidably supports the hub $y$. A bar 1 is secured to this hub by means of set screws 2, and has secured thereto a counter-weight 3 at one end. At the other end of the bar 1 is secured the special fixtures 4 which slidably support the vertical rods or slide members 5. The collars 6 are adjustably secured to the slide members 5 to limit the downward movement of the rods, said rods provided on one side with the teeth 7 (see Fig. 3). Secured to the base $x$ are the cams 8 and the hub $y$ is provided with an overhanging flange 9 that engages the cams 8.

Secured to the revolving table and preferably to one of the bearing blocks $j$ is an L-shaped trip 10, and adjustably secured to the bar 1 and projected downwardly therefrom is a trip rod 11. As the table revolves the trip 10 engages this trip rod and moves the bar 1 in a clockwise direction, as viewed in Fig. 1, thereby causing the hub $y$ to revolve with respect to the base $x$, and cause the overhanging flange carried by the hub $y$ to ride up on the cam 8, thereby raising the bar 1 and trip rod 11 after the bar has been moved a predetermined distance. The trip rod then disengages from the trip and permits the coil spring 12 which is secured to the hub $y$ and anchored to the stationary table to return the bar 1 and mechanism carried thereby to the original or starting position.

I have provided two slide members 5 which are connected together by the bridge 13 at the top and the lower ends of the slide members support the gas-pipe 14, which is provided with the T-fitting 15, which carries the burner tips 16. In the position shown in Fig. 2 these burner tips have been dropped down between the mold sections and the operation of coating the molds with carbon is commenced.

As the bar 1 is revolved with the table by means just described it obviously carries with it the fixtures 4 and the slides 5. Secured to the bridge 13 is a cable or chain 17 (see also Fig. 4), and supported from the ceiling is a bracket 18 which pivotally supports a rock arm 19. The cable 17 is secured to one end of this rock arm, and on the opposite side of the pivot a fixture 20 is adjustably secured, and has secured thereto the cable 21. This cable 21 passes around a pulley 22 supported on the stationary table and thence to the end of the bar 1, to which it is secured as at 23 (see Fig. 2). Now as the bar 1 is revolved or moved with the revolving table it pulls on the cable or chain 21, thereby pulling downward on the rock arm 19, thereby raising that portion of the rock arm on the other side of the pivot to which the cable 17 is secured. This will pull up on the cable 17 and raise the slide bars 5, thereby raising the gas-pipe and causing the flame to be raised and moved at a uniform speed up along the mold.

Slidably supported in the fixture 4 is the pawl 25 (Fig. 3), which is yieldingly held in engagement with the teeth 7 on the slide rod by the spring 26. As the slide rod is lifted this pawl will prevent the same from falling. As the bar 1 is returned obviously this slide rod could fall due to the slack in the cable were it not for this pawl. When the bar is returned to its original position or starting point means are provided for releasing the slide rod so as to permit the same to fall by gravity, so as to drop the burner tips 16 into the following set of mold sections carried by the revolving table, whereupon the carbon-coating operation may be repeated. Secured to the stationary table is an inverted L-shaped bracket 27 (see Fig. 6) which is adapted to provide a stop for the bar 1, and the arm of said bracket is arranged to engage the bell-cranks 28 pivotally supported to the fixture 4. One end of each bell-crank is engaged with the stem of the pawl 25, as at 29. As the bar 1 returns this bracket 27 is in the path of the crank 28 which strikes the arm of the bracket and kicks up the bell-cranks, and withdraws the pawls from engagement with the slide rods, thus permitting the same to fall by gravity. The arm of this bracket is extended a sufficient length so as to actuate the bell-cranks carried by both of the fixtures 4, and will actuate them simultaneously.

The advantage of this construction is that the flame is raised at a steady speed and also in a true vertical line so that the burner tips are at all times equi-distant from the mold.

In Fig. 7 I show a modified form of construction in which the same bar 1 is used, the same fixtures 4, the same slide and the control means for tripping the same, but instead of the cable or chain hook-up shown in the other figures I secure one cable 30 to the cross bridge 13, pass the same over the pulley 31, supported by the bracket 32, secured to the ceiling. The form of hook-up gives the same result as shown in the other figures, and operates the flame raising mechanism in identically the same way.

As stated in the introductory matter, the opening and closing of the mold sections is done in such a way as to avoid cramping or sticking. Note that the slide bar $s$ which is operated by the roll $u$ and the cam groove is attached to the mold carrier $m$ in both the vertical and the horizontal centers of the section. This will be evident from the comparison of Figs. 1 and 2. This is a marked improvement over devices with which I am familiar for mechanically opening and closing mold sections. They usually involve levers, links, etc., and very often hinging operations, while with my apparatus the mold sections are guided and welded to each other in a straight or rectilinear approach or separation on the horizontal guide bars $k$ and the thrust is directly on the center, both horizontally and vertically of the moving member. Hence the action is an easy and reliable one.

What I claim is:

1. In a molding apparatus, the combination of a pair of mold section carriers which have straight relative movement toward and away from each other in closing and opening, and mechanical means having connection with one of the mold section carriers at the geometric center for applying the thrust and the draft in closing and opening the sections.

2. In a molding apparatus, the combination of a pair of mold section carriers guided with respect to each other for a relative movement directly toward and away from each other rectilinearly, and mechanical means for sliding one of said mold section carriers to give such relative movement and having connection with such mold section carrier at both the vertical and horizontal centers of such mold section carriers.

3. In a molding apparatus, the combination of a pair of mold section carriers slidable rectilinearly toward and away from each other on guide bars, and a slide bar coupled up with one of said carriers at the geometric center thereof, and having means at the opposite end by which the same is reciprocated at predetermined periods to open and close the mold.

4. In a molding apparatus, the combination of a pair of mold section carriers arranged to have relative movement toward and away from each other rectilinearly, a slide bar connected with one carrier at its geometric center, a cam member having connection with the opposite end of the slide bar to reciprocate the slide bar at predetermined periods to open and close the mold.

5. In a molding apparatus, the combination of a rotary table, a pair of guide rods carried by the table, mold sections carried by the guide rods, a draft rod connected to one of the mold sections for moving this section along the guide rods to open and close the mold, and springs acting upon the second mold section to exert a pressure against the force of the draft rod when the mold is closed.

6. A molding apparatus comprising mold sections, guide devices for supporting these mold sections and means for the reciprocating one mold section on the guide devices for opening and closing the mold, one of said mold sections being mounted on the guide devices so as to have a limited movement relative thereto, whereby a tight contact between the sections is effected.

7. A mold apparatus comprising mold sections, means for reciprocating one mold section on the guide devices for opening and closing the mold, one of said mold sections being mounted on the guide devices so as to have a limited movement relative thereto, and springs acting upon the thus mounted section, whereby a tight contact between these sections is effective.

In testimony whereof I have affixed my signature.

HARRY S. LEE.